United States Patent [19]

Nohtomi et al.

[11] Patent Number: 4,754,337
[45] Date of Patent: Jun. 28, 1988

[54] COPY MACHINE FOR A MOTOR VEHICLE

[75] Inventors: Hiroshi Nohtomi, Yokohama; Hitoshi Ishikawa, Nishio, both of Japan

[73] Assignee: Aisin Seiki Kabushiki Kaisha, Japan

[21] Appl. No.: 945,978

[22] Filed: Dec. 24, 1986

[30] Foreign Application Priority Data

Dec. 25, 1985 [JP] Japan .......................... 60-202036[U]

[51] Int. Cl.$^4$ .......................... H04N 1/04; H04N 1/12
[52] U.S. Cl. ..................................... 358/286; 358/294; 455/99; 455/345
[58] Field of Search ............... 358/286, 285, 294, 256, 358/257; 455/345, 99

[56] References Cited

U.S. PATENT DOCUMENTS

| 2,672,503 | 3/1954 | Hallden | 358/257 |
| 3,527,882 | 9/1970 | Brouwer | 358/286 |
| 3,550,001 | 12/1970 | Hanley | 455/345 |
| 4,542,414 | 9/1985 | Nagane | 358/294 |
| 4,598,323 | 7/1986 | Honjo | 358/285 |
| 4,652,937 | 3/1987 | Shimura | 358/286 |

Primary Examiner—Howard W. Britton
Attorney, Agent, or Firm—Sughrue, Mion, Zinn, Macpeak, and Seas

[57] ABSTRACT

A copy machine designed specifically for mounting adjacent the console of a motor vehicle between the front seats thereof includes an elongated rectangular chassis having a cover member pivoted at one end thereof and an output table pivoted at the opposite end thereof with the upper surfaces of the cover member and output table defining an armrest surface. An image reader is mounted in the cover member and cooperating feed rolls are provided on a chassis and cover member for feeding an original document past the image reader and outwardly through an aperture in the upper surface of the output table. An input table is pivotally mounted coaxially with the cover member to provide a guide surface for feeding the original document between the cover member and the chassis. A printing mechanism including a paper supply is mounted in the chassis adjacent the paper feeder and an internal cover member directs the printed copy to a storage compartment which is accessible upon lifting the output table.

4 Claims, 4 Drawing Sheets

COPY MACHINE FOR A MOTOR VEHICLE

BACKGROUND OF THE INVENTION

The present invention is directed to a copy machine reader for use with a facsimile or duplicating machine and more particularly to an image reader therefore which is easily accessible for servicing when used in a facsimile machine mounted in the console of a vehicle.

A conventional image reader for a facsimile machine is usually provided with a transparent support plate upon which an original document may be placed. A scanning head is provided beneath the transparent support plate and scans the original document across the width thereof and converts optical images into electrical signals. This arrangement is especially effective for reading thick documents without causing any damage to the original document. However such an arrange requires sufficient space for moving the scanning head and it is not practical to install such a facsimile machine in a very limited space such as in a console between the seats in a motor vehicle.

Another conventional arrangement of an image reader includes roller means for feeding the original document. The scanning head is fixed on the image reader and scans the information on a document passing through the image reader line-by-line. Such an arrangement may cause damage to the original document since the original document is supplied through a narrow gap between the housing and the image reader. Thus a damaged document may easily become jammed in the feeding gap which will cause even greater damage to the original document. Furthermore, pieces of the original document may become detached from the original document during passage of the document through the narrow gap and subsequently adhere to the scanning head thereby causing poor transmission quality.

SUMMARY OF THE INVENTION

The present invention provides a new and improved image reader for a facsimile machine suitable for use in a small enclosure which is easy and convenient to maintain.

The present invention provides a new and improved image reader for a facsimile machine wherein either the paper feeding means or the scanning head means may be mounted on a fixed chassis while the other means is mounted in a support frame adapted to pivot relative to the chassis in order to achieve easy access to the paper feeding means and the scanning head means. Thus if a document jams in the facsimile machine the document may be easily recovered by pivoting the supporting frame to the open position. When the transmission quality of the facsimile machine is adversely affected by dirt or scraps of paper the scanning head means can be easily cleaned by pivoting the supporting frame for one of the means to an open easily accessible position.

The present invention is directed to a copy machine suitable for use in a small space such as adjacent the console of a motor vehicle between the front seats thereof wherein the copy machine is provided with an elongated rectangular chassis having a cover member pivoted on one end thereof and an outlet table member pivoted on the opposite end thereof so that in the closed portion said members act as an armrest. An image reader is mounted on the cover member and the original document may be fed between the cover member and the chassis by driven feed rollers mounted on the chassis. Printing means and copy paper supply means are mounted on the chassis between the paper feed means and a compartment for receiving the print copy from the printing means. The outlet table is provided with an aperture in the upper surface thereof and an inclined ramp leading from the paper feeding means to the aperture for discharging the original document.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
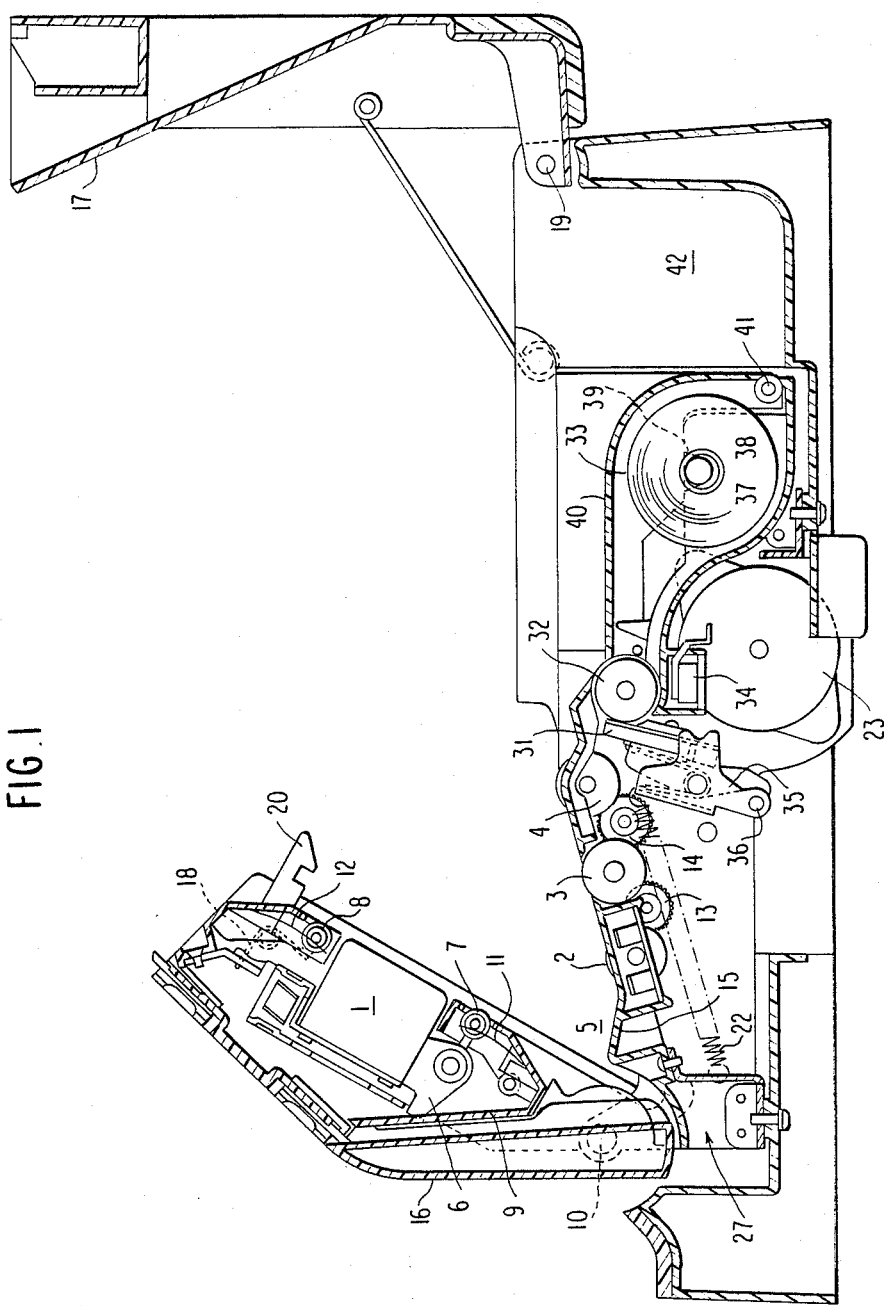
FIG. 1 is a sectional side elevation view of an embodiment of a facsimile machine utilizing the image reader means according to the present invention.

An embodiment of the image reader according to the present invention will be described with reference to FIGS. 1, 2, and 3. In this embodiment the image reader is applied to a facsimile machine which is adapted to be used in a motor vehicle.

Reader unit 6 includes a reader head 1, leaf springs 11 and 12, rollers 7 and 8, and a cover 9 made of synthetic resin material. Rollers 7 and 8 are depressed downwardly by the spring force of the leaf springs 11 and 12, respectively. Reader unit 6 is pivotally mounted on a chassis 27 by pin 10.

Rollers 2, 3, and 4 are provided on a main body cover 15. Rollers 2 and 4 are opposed to and cooperate with rollers 7 and 8, respectively, when the reader unit 6 is in the closed position. The rollers 2, 3, and 4 are connected by gears 13 and 14 which are driven by motor 23.

Input table 16 is also pivotally mounted at opposite sides thereof on pin 10. In use, the input table 16 is opened, as shown in dotted lines at the left side of FIG. 3. An original document is inserted into a gap 5 between the cover 9 of the reader unit 6 and the cover 15 of the chassis 27. When the leading end of the original document reaches the rollers 2 and 7, the document will be fed by the rollers 2 and 7 automatically. Output table 17 receives the document which has been read by the reader head 1. The output table 17 is also pivotally mounted on the chassis 27 by a pin 19. The table 17 is shown by dotted lines in the open position at the right side of FIG. 3.

Figure 2:
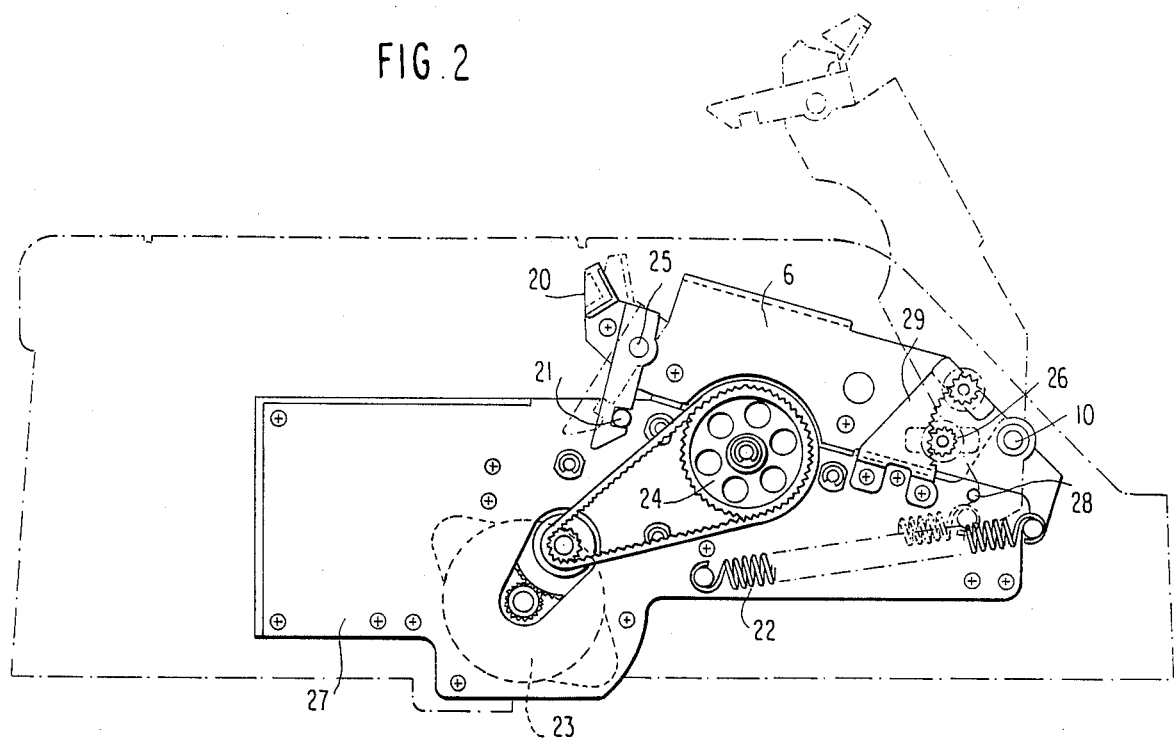
FIG. 2 is a partial side elevation view of the facsimile machine shown in FIG. 1 from the opposite side thereof showing the drive arrangement.

As shown in FIG. 2 the reader unit 6 is constantly biased to its open position by a coil spring 22. The other side of the reader unit 6 has a latch 20 pivoted thereon by a pin 25. The latch 20 is connectable with a pin 21 which is fixed to the chassis 27. The reader unit 6 is provided with gears 26 engageable with a gear plate 19 fixed to the chassis 27. These gears provide frictional resistance to the opening of the reader unit 6 in order to decrease the opening speed of the reader unit 6. Pin 28, fixed to the chassis 27, stops the reader unit 6 in the fully open position as shown in dotted lines in FIG. 3. Motor 23 is fixed to the chassis 27 and operates to rotate a pulley 24 through a transmission mechanism. The pulley in turn rotates the rollers 2, 3, and 4.

Figure 4A:
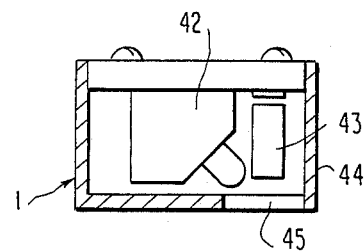
FIGS. 4a and 4b are partial sectional views of the reading head according to the present invention.

Reader head 1, as illustrated in FIG. 4a, includes a lighting element 42 and a sensing element 43 in a box 44. The box 44 is provided with a transparent glass 45 which is effective to protect the sensing element 43 from dust.

Figure 4B:
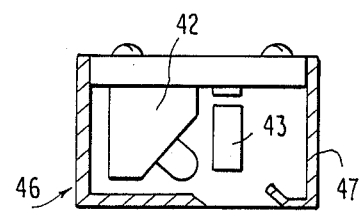

Another embodiment of a reader head 46 is illustrated in FIG. 4b. This reader head 45 also includes a lighting element 42 and a sensing element 43 in a box 47. However this reader head 46 is not provided with a glass cover for the opening.

Figure 5A:
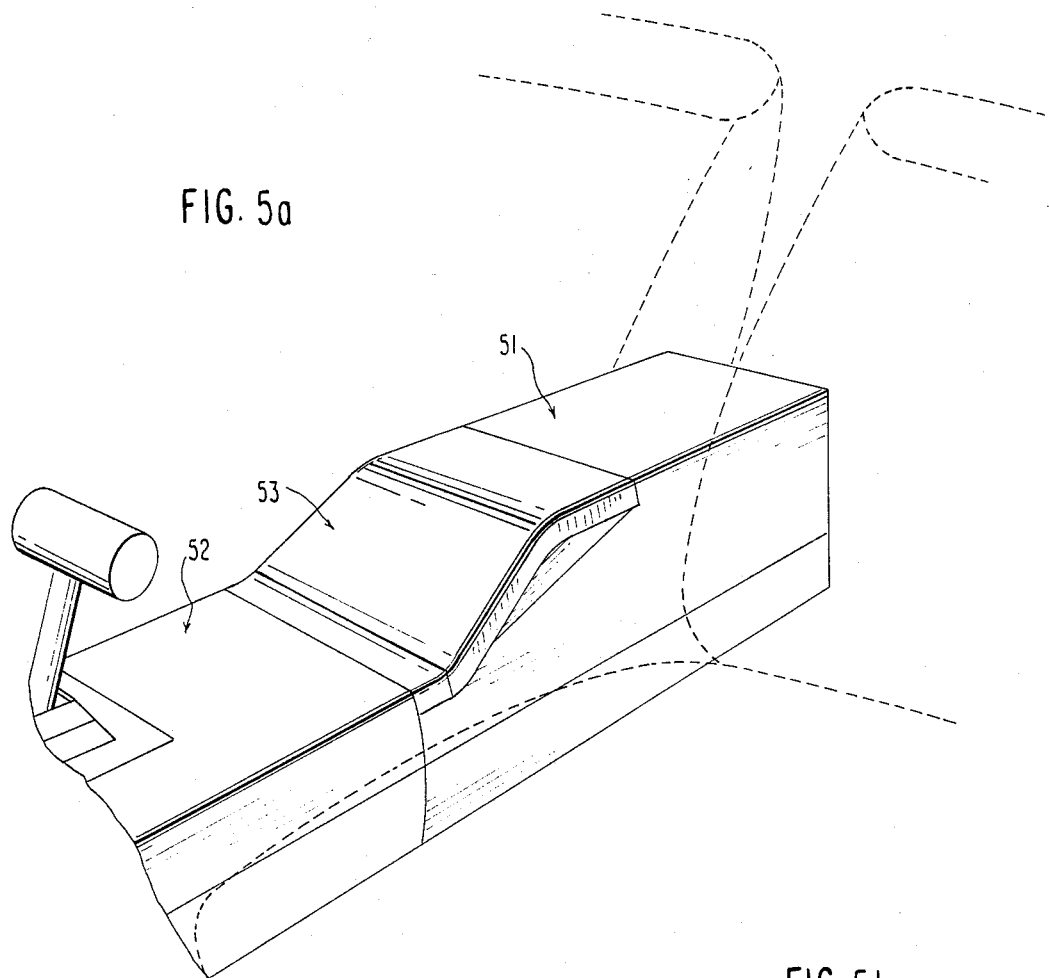
FIG. 5a is a perspective view of the facsimile machine disclosed in FIG. 1 set in the console of the motor vehicle between the front seats thereof.
Figure 5B:
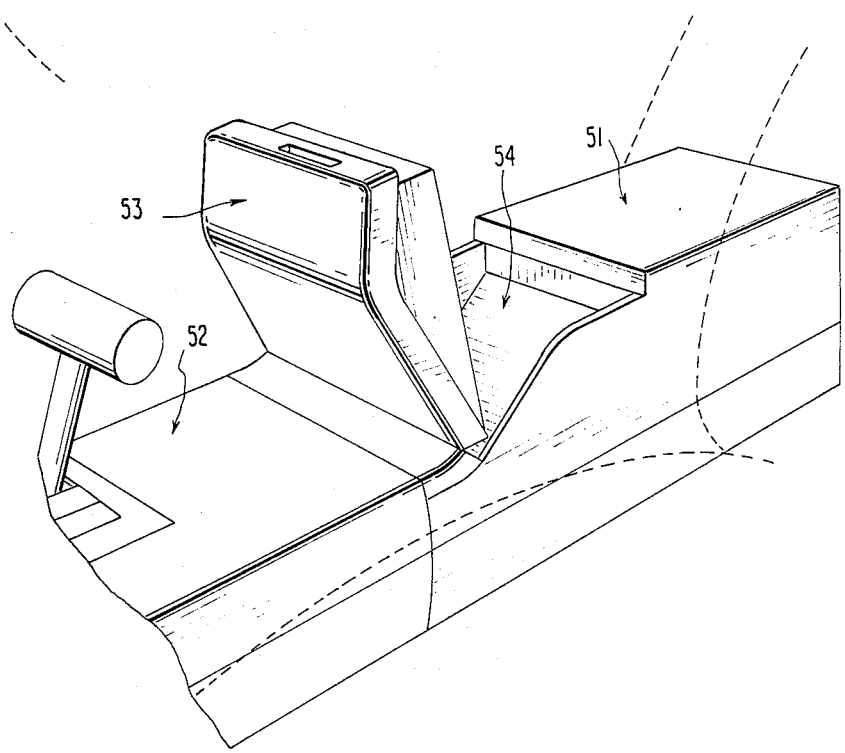
FIG. 5b is a perspective view similar to FIG. 5a with the reader means pivoted to the open position.

A facsimile machine 51 according to the present invention is installed in a vehicle console box 52, as illustrated in FIGS. 5a and 5b. FIG. 5a shows the reader head 53 in its closed operating position. FIG. 5b shows the reader head 53 in the open position to provide a gap 54 between the reader head 53 and the feeding mechanism 54 to facilitate maintenance.

Figure 3:
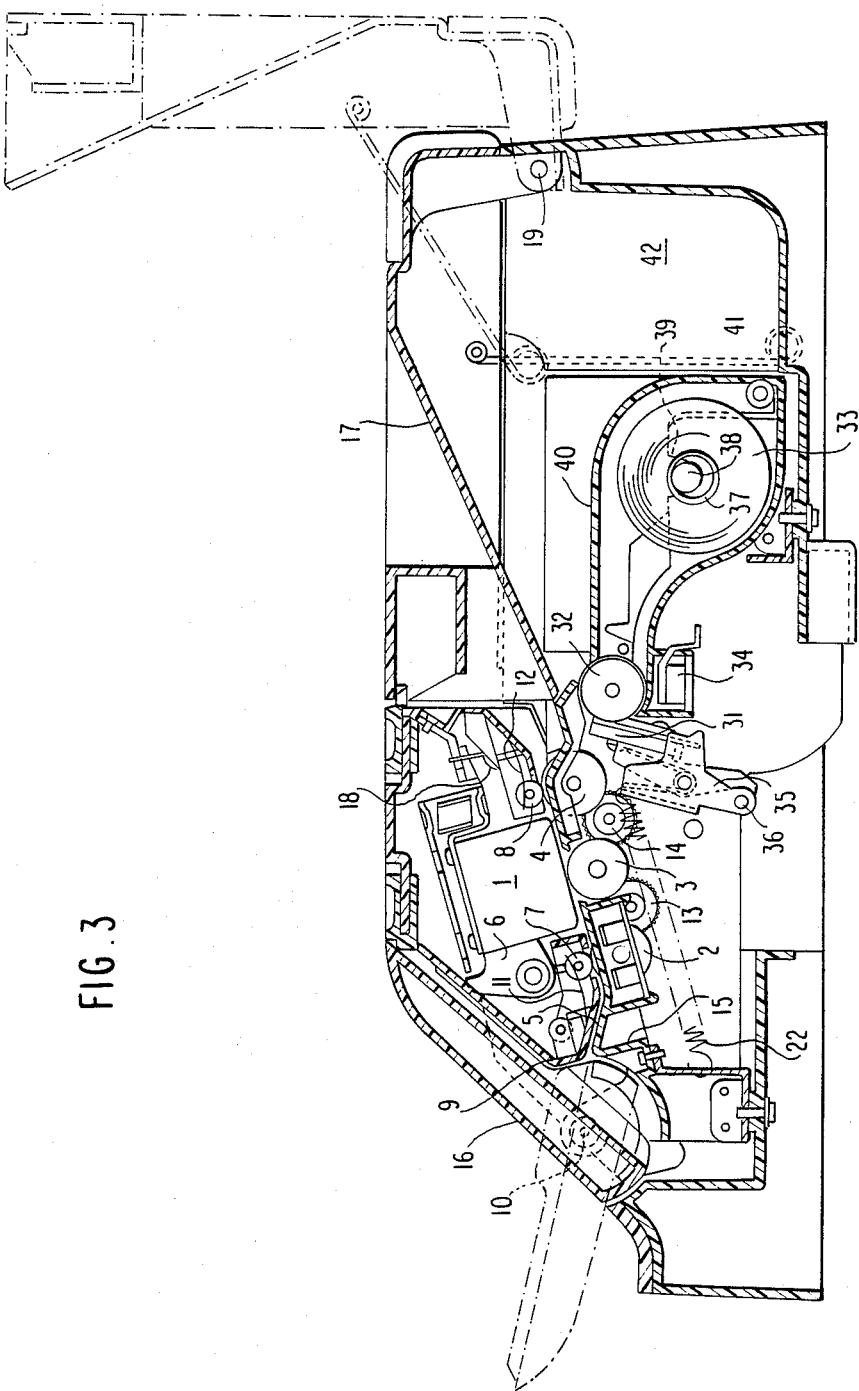
FIG. 3 is a side elevation sectional view similar to FIG. 1 showing a different position of the parts of the facsimile machine.

With reference to FIGS. 1 and 3, a printing device 31 may be a thermal printing device. The printing device 31 is carried by a bracket 35 which is pivoted on a pin 36. This makes a gap between the printing device 31 and the platen 32 in order to feed recording paper 33. A microswitch 34 is also provided to sense the end of the paper 33. Paper 33 is rolled on a tube 37 and is supported by a shaft 38 inserted into tube 37 and placed in a slot 39 in the chassis 27. An internal cover is rotatably fixed to the chassis 27 by a pin 41. The recording paper 33 is fed between the platen 32 and the switch 34, between the printing device 31 and platen 32 and directed outside of the internal cover 40. Therefore the printed paper is passed along the upper surface of the internal cover 40 and stored in the compartment 42. In the compartment 42 the printed paper may roll up since the paper has a natural tendency to roll.

The output table 17 is provided with an aperture in the upper surface thereof and an angled support surface on the underside thereof which extends between the paper feeding means and the aperture so as to direct the original document outwardly through the output table. The upper surface of the output table 17 and the cover member 16 provide an armrest when the copy machine is disposed adjacent the console of a motor vehicle between the front seats thereof.

While the invention has been particularly shown and described with reference to a preferred embodiment thereof it will be understood by those in the art that the foregoing and other changes in form and details may be made therein without departing from the spirit and scope of the invention.

What is claimed is:

1. A copy machine comprising a chassis, a cover member pivoted on said chassis, paper feeding means for feeding an original document between said cover member and said chassis, reader means for reading an optical image on said original document and converting said optical image into an electrical signal; said paper feeding means being mounted on one of said chassis and cover member and said reader means being mounted on the other of said chassis and cover member; and tray means pivotally mounted on said chassis for movement between a first position overlying said cover member and blocking the entrance to said paper feeding means between said chassis and said cover member and a second position wherein said tray means defines a flat surface in alignment with the paper feeding means between said chassis and said cover member for directing an original document therebetween.

2. A copy machine comprising a chassis, a cover member pivoted on said chassis, paper feeding means for feeding an original document between said cover member and said chassis, reader means for reading an optical image on said original document and converting said optical image into an electrical signal; said paper feeding means being mounted on one of said chassis and cover member and said reader means being mounted on the other of said chassis and cover member; and printing means including copy paper supply means mounted on said chassis adjacent said paper reading means, a printed document storage compartment defined by said chassis and internal cover means pivotally mounted on said chassis in overlying relation to said copy paper supply means between said printing means and said compartment for guiding the printed copy paper from said printing means to said storage compartment.

3. An image reader as set forth in claim 2 further comprising an output table pivotally mounted on said chassis for pivotal movement between a closed position overlying said printing means, said copy paper supply means and said compartment and an open position to provide access for service and for printed copy removal; said output table having an upper surface with an aperture and a lower inclined surface extending between said aperture and said paper feeding means in the closed position for receiving an original document from said paper feeding means subsequent to reading of said original document by said reader means.

4. A copy machine as set forth in claim 3 wherein said chassis, said cover member and said output table define in the closed position an elongated substantially rectilinear box-like structure adapted to be disposed adjacent a console box of a motor vehicle between the front seats thereof with said cover member and said output table defining an armrest structure.

* * * * *